United States Patent
Ting

(10) Patent No.: US 7,590,781 B2
(45) Date of Patent: Sep. 15, 2009

(54) SIGNAL PROCESSING SYSTEM FOR ELECTRONIC SYSTEMS HAVING DIFFERENT TYPES OF INPUT/OUTPUT CONTROLLERS

(75) Inventor: Chao-Pang Ting, Taipei (TW)

(73) Assignee: Inventec Corporation, Taipei (TW)

( * ) Notice: Subject to any disclaimer, the term of this patent is extended or adjusted under 35 U.S.C. 154(b) by 235 days.

(21) Appl. No.: 11/704,048

(22) Filed: Feb. 7, 2007

(65) Prior Publication Data

US 2008/0130427 A1 Jun. 5, 2008

(51) Int. Cl.
*G11B 21/08* (2006.01)
*G06F 3/00* (2006.01)
*G06F 13/12* (2006.01)

(52) U.S. Cl. .................. 710/74; 369/30.01; 369/33.01; 710/15; 710/16; 710/62

(58) Field of Classification Search .................. 709/230; 710/1, 8, 10, 15, 16, 19, 62, 63, 64, 72, 74
See application file for complete search history.

(56) References Cited

U.S. PATENT DOCUMENTS 5,214,762 A * 5/1993 Bush et al. .................... 710/17

2006/0149881 A1 * 7/2006 Clayton et al. .............. 710/302

* cited by examiner

*Primary Examiner*—Alford W Kindred
*Assistant Examiner*—Richard Franklin
(74) *Attorney, Agent, or Firm*—Peter F. Corless; Steven M. Jensen; Edwards Angell Palmer & Dodge LLP

(57) ABSTRACT

The present invention discloses a signal processing system applicable in an electronic system having a hard disk, an indicator and an I/O controller, the I/O controller processing a driving signal outputted by the hard disk and generating a first processing signal. The signal processing system includes an editing module for editing a plurality of decoding modes, a detecting module for detecting a type of the I/O controller and outputting type messages corresponding to the detected type of the I/O controller; an acquiring module for acquiring the decoding mode from the editing module according to the type messages outputted by the detecting module; and a decoding module for decoding the first processing signal outputted by the I/O controller according to the decoding mode acquired by the acquiring module and generating a second processing signal to drive the indicator to operate, thereby simplifying the design and reducing the cost.

5 Claims, 2 Drawing Sheets

SIGNAL PROCESSING SYSTEM FOR ELECTRONIC SYSTEMS HAVING DIFFERENT TYPES OF INPUT/OUTPUT CONTROLLERS

BACKGROUND OF THE INVENTION

1. Field of the Invention

The present invention relates generally to signal processing systems, and more particularly to a signal processing system applicable in electronic systems, wherein, without the need of changing design of the electronic systems having different types of I/O controllers, the signal processing system can control hard disks of the electronic systems by performing decoding processes.

2. Description of Related Art

Generally, a computer system or a server system at least comprises a central processing unit (CPU), a hard disk and a memory, wherein the hard disk functioning as a data storage device plays a key role in the whole system because most of the programs and data for system operation are stored in the hard disk.

Generally, in order to facilitate a system user to identify the current status of the hard disk such as whether the hard disk is inserted into the system and whether a data access operation is performed to the hard disk, a driving circuit is disposed on the hard disk such that when the system performs a data access on the hard disk, the driving circuit can generate a pulse signal ACTLED_N, which further drives an LED to operate for showing the current status of the hard disk to the user. For example, by combining a GEM318 hot plug hard disk management pin disposed on the back-plate of the system with other simple peripheral components, indicating status of the system LED can be controlled, wherein the indicating status can be present/activity/fault/rebuild. However, the GEM318 hot plug hard disk management pin is expensive and accordingly is not suitable to be used in mass-produced products.

The LED indicating technology can further be controlled by management software built inside the system. Through a command-line interface (CLI), the management software can acquire hard disk information from the hard disk pin driving, and sends an inherent Smbus command to the GPIO device such that the GPIO device can control operation of the system LED. However, such a method needs additional GPIO devices disposed inside the system, which is not cost-efficient. Also, for different processors, data pattern of the GPIO interface is different. Therefore, different decoders need to be designed according to different I/O pins for performing decoding process to the LED driving signal such that the processed driving signal can drive LED to operate, which thus complicates the product design.

Therefore, there is a need to develop a signal processing technology for overcoming the above drawbacks.

SUMMARY OF THE INVENTION

According to the above drawbacks, an objective of the present invention is to provide a signal processing system applicable in an electronic system having a hard disk, an indicator and an I/O controller, for reducing the cost and simplifying the design.

In order to attain the above and other objectives, the present invention provides a signal processing system applicable in an electronic system having a hard disk, an indicator and an I/O controller, the I/O controller processing a driving signal outputted by the hard disk and generating a first processing signal output. The signal processing system includes a detecting module for detecting a type of the I/O controller and outputting type messages corresponding to the type of the I/O controller, an acquiring module for acquiring a decoding mode corresponding to the type messages, and a decoding module for decoding the first processing signal outputted by the I/O controller according to the decoding mode and generating a second processing signal to drive the indicator to operate.

According to another embodiment of the present invention, the signal processing system further includes an editing module, which allows users to edit a plurality of editing modes.

The hard disk includes a connector having a pin disposed for outputting the driving signal. When the connector is connected with a hard disk, or when the electronic system accesses the hard disk, or when the hard disk connected with the connector is abnormal, the I/O controller receives the driving signal from the pin of the connector and processes the driving signal and generates the first processing signal. Thus, the decoding module decodes the first processing signal according to a corresponding decoding mode.

The I/O controller has a GPIO interface. The detecting module knows the type of the I/O controller by detecting the GPIO interface of the I/O controller. The I/O controller outputs the first processing signal to the decoding module through the GPIO interface such that the decoding module can further decode the first processing signal.

Therefore, according to the signal processing system of the present invention, an editing module first pre-edits various decoding modes corresponding to different types of I/O controllers, an acquiring module then acquires a decoding mode from the editing module according to type messages corresponding to the type of the I/O controller detected by a detecting module, a decoding module then decodes the first processing signal of the I/O controller according to the decoding mode acquired by the acquiring module, and generates a second processing signal to drive the indicator of the electronic system to operate. Therefore, the present invention can provide different decoding modes corresponding to different I/O controllers such that the first processing signals outputted by different I/O controllers can be decoded according to the corresponding decoding modes, thus eliminating the need of designing different decoders corresponding to different I/O controllers. Meanwhile, the present invention avoids to build up high cost hardware construction or use additional software construction for driving the LED to operate. Accordingly, the present invention overcomes the conventional drawbacks of complex designing and high cost of products.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be made without departing from the spirit of the present invention.

Figure 1A:
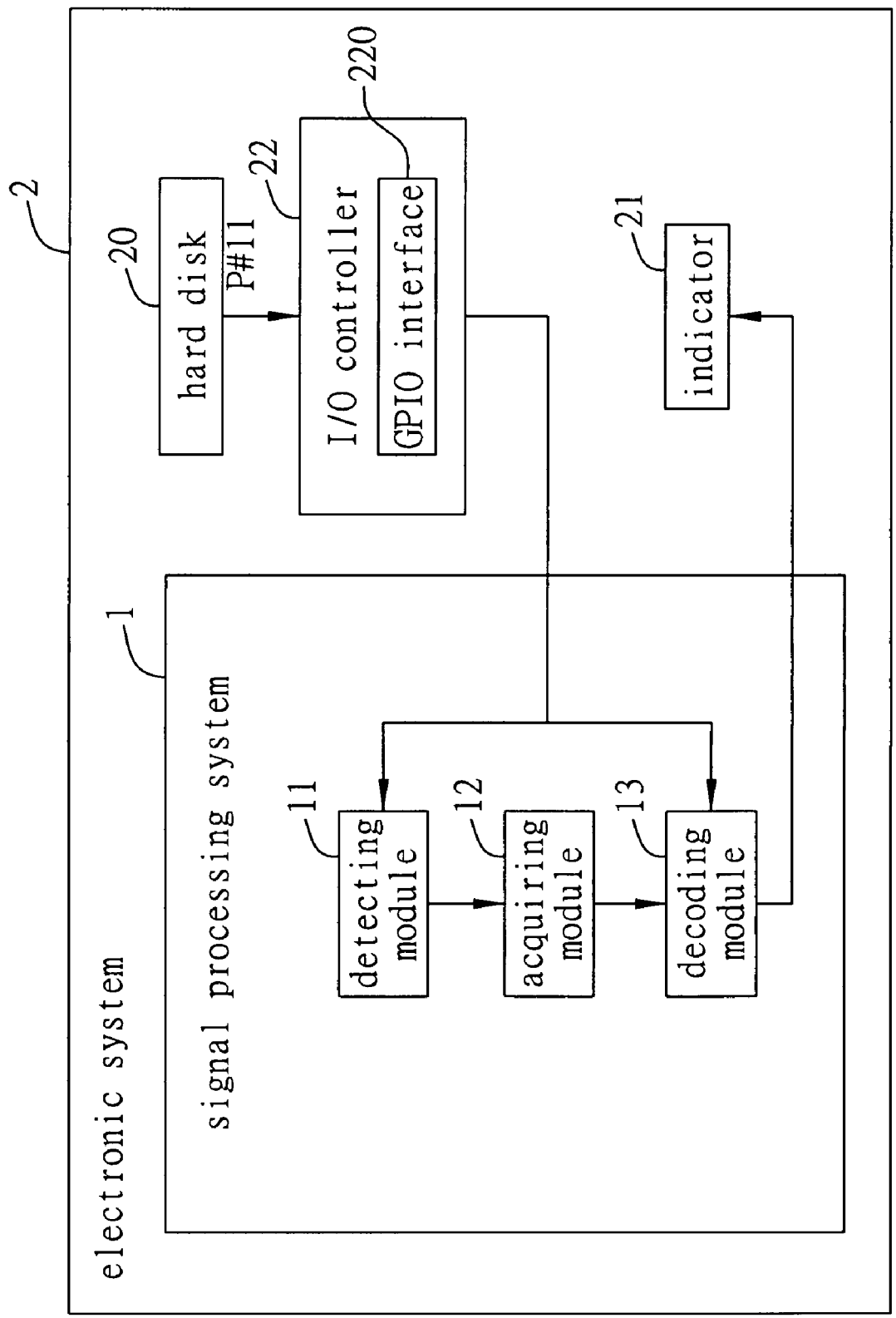
FIG. 1(A) is a block diagram of an electronic system having a signal processing system of a first embodiment according to the present invention.

FIG. 1(A) is a block diagram of an electronic system 2 having a signal processing system 1 of a first embodiment according to the present invention. The signal processing system 1 is applied in the electronic system 2. The electronic system 2 has a hard disk 20 such as a SATA hard disk or a SAS hard disk, an indicator 21 such as an LED indicator, and an I/O controller 22 such as a CPU (central processing unit). The electronic system 2 can be, for example, a personal computer system, a notebook computer system or a server system. The hard disk 20 comprising a connector having a pin P#11 disposed for outputting a driving signal to drive the indicator 21 to operate. The I/O controller 22 has a GPIO interface 220. In the present invention, the I/O controller 22 pre-processes the driving signal outputted by the pin P#11 and generates a first processing signal and outputs the first processing signal through the GPIO interface 220. Since the principle of processing the driving signal by the I/O controller 22 is well known in the art, and the characteristics of the present invention is not in this art, detailed description of it is omitted.

The signal processing system 1 comprises a detecting module 11, an acquiring module 12 and a decoding module 13.

The detecting module 11 is used to detect type messages of the I/O controller 22 of the electronic system 2 and output the detected type messages of the I/O controller 22. In detail, the detecting module 11 detects the type messages of the I/O controller 22 by referring to a GPIO signal comprising information about the type messages of the I/O controller 22 transferred by the GPIO interface 220 of the I/O controller 22. The type messages of the I/O controller 22 are provided by an I/O controller manufacturer such as INTEL™, AMD™ and so on. The detecting module 11, by detecting GPIO pins, get to know that the I/O controller 22 is an I/O controller manufactured by INTEL™, AMD™ or other manufacturers.

The acquiring module 12 is used to acquire a decoding mode from the electronic system 2, the decoding mode corresponding to the type messages of the I/O controller 22 outputted from the detecting module 11.

The decoding module 13 performs a decoding process on the first processing signal outputted by the I/O controller 22 according to the decoding mode acquired by the acquiring module 12 and generates a second processing signal. The second processing signal is further outputted to the indicator 21 such that the indicator 21 can be driven to operate by the second processing signal. Through the operation of the indicator 21, the user can know whether the hard disk 20 of the electronic system 2 is a SAS hard disk or a SATA hard disk, whether the electronic system 2 accesses the SAS hard disk or SATA hard disk, or whether the SAS hard disk or SATA hard disk is abnormal (for example, error connection between the hard disk and the connector, or hard disk damage).

In the first embodiment, the above-described detecting module 11, acquiring module 12 and decoding module 13 can be implemented by a complex programmable logic device (CPLD), and various decoding modes corresponding to different I/O controllers 20 can be stored in the CPLD.

Figure 1B:
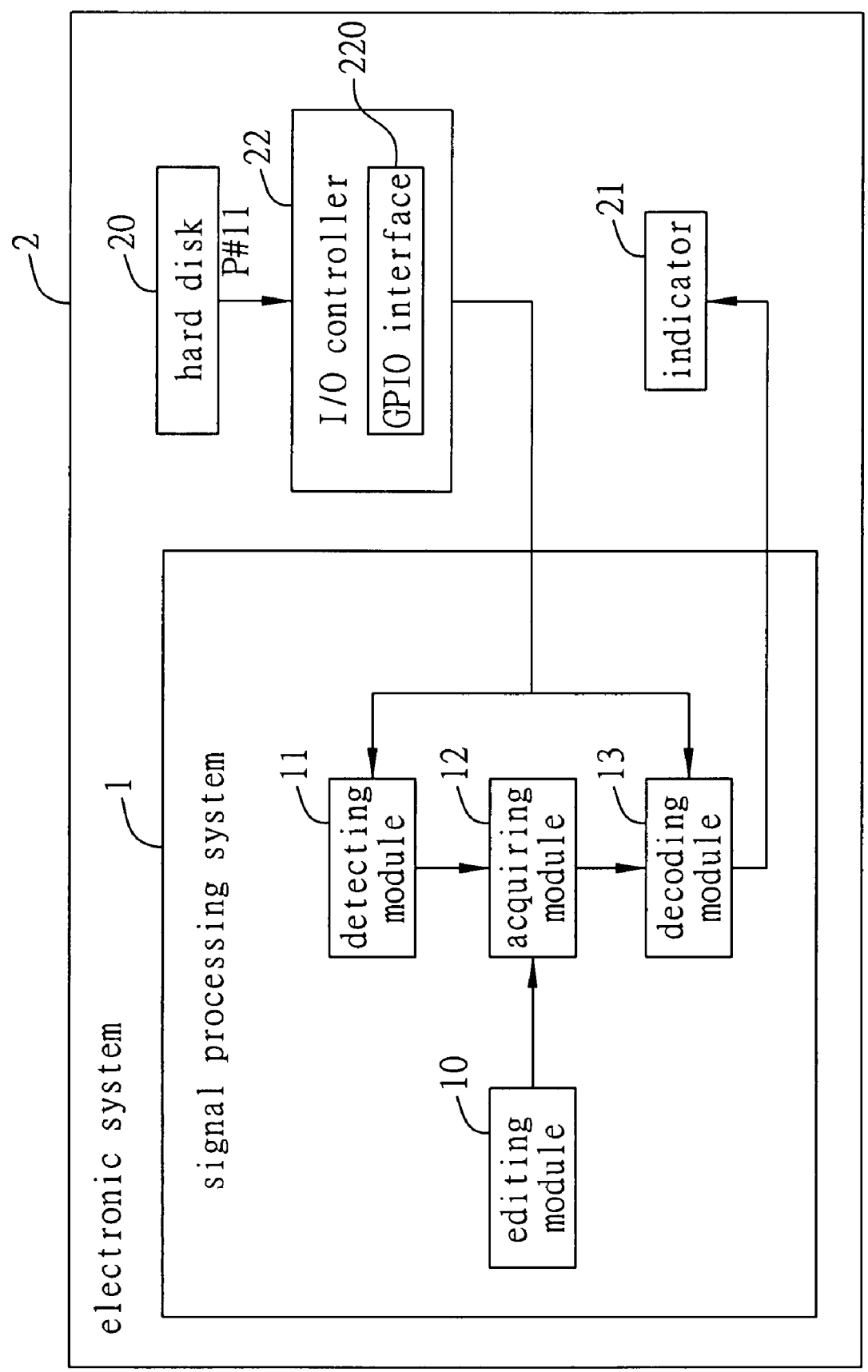
FIG. 1(B) is a block diagram of an electronic system having a signal processing system of a second embodiment according to the present invention.

The signal processing system 1 may further comprise an editing module 10, as shown in FIG. 1(B). The editing module 10 allows a user can edit a plurality of decoding modes and store the edited decoding modes in the CPLD for subsequent decoding processing. In the second embodiment, the decoding modes edited by the editing module 11 correspond to type messages of the I/O controllers 22 used by the electronic system 2. The decoding modes comprise a decoding operating method.

Therefore, the signal processing system of the present invention mainly pre-edits various decoding modes corresponding to different types of I/O controllers through an editing module such that an acquiring module can acquire a decoding mode from the editing module according to the message of the type of the CPU detected by the detecting module, then the decoding module performs a decoding process on the indicator driving signal outputted by the hard disk connector and processed by the I/O controller according to the decoding mode acquired by the acquiring module, and the processed driving signal further drives the indicator of the electronic system to operate. Therefore, the present invention can provide different decoding modes corresponding to different I/O controllers of different CPU providers such that indicator driving signals processed by the I/O controllers of different CPU providers can be decoded according to the corresponding decoding modes, thereby eliminating the need of designing different decoders corresponding to different I/O controllers. Meanwhile, the present invention avoids to build up high cost hardware construction or use additional software construction for driving the LED to operate. As a result, the present invention overcomes the conventional drawbacks of complex designing and high cost of products.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A signal processing system applicable in an electronic system comprising a hard disk, an indicator and an I/O controller electrically connected to the hard disk for processing a driving signal outputted by the hard disk and generating a first processing signal, the signal processing system comprising:
   a detecting module for detecting a type of the I/O controller and outputting type messages corresponding to the type of the I/O controller;
   an acquiring module for acquiring at least a decoding mode corresponding to the type messages;
   a decoding module for decoding the first processing signal outputted by the I/O controller according to the decoding mode and generating a second processing signal to drive the indicator to operate; and
   an editing module for allowing users to edit a plurality of decoding modes.

2. The system of claim 1, wherein the hard disk comprises a connector having a pin disposed for outputting the driving signal.

3. The system of claim 2, wherein the driving signal is generated when a data access process is performed on the hard disk or when the hard disk is abnormal.

4. The system of claim 1, wherein the I/O controller has a GPIO interface.

5. The system of claim 4, wherein the detecting module detects the type of the I/O controller through the GPIO interface, and the I/O controller outputs the first processing signal to the decoding module through the GPIO interface such that the decoding module can further decode the first processing signal.

* * * * *